United States Patent [19]
Chiswell et al.

[11] 3,861,799
[45] Jan. 21, 1975

[54] CAMERA

[75] Inventors: Earl Chiswell, Bloomington;
Clarence O. McMaster, Mahtomedi, both of Minn.

[73] Assignee: Minnesota Mining and Manufacturing Company, St. Paul, Minn.

[22] Filed: Jan. 26, 1973

[21] Appl. No.: 326,980

[52] U.S. Cl. .................................... 355/64, 355/99
[51] Int. Cl. .......................................... G03b 27/32
[58] Field of Search ............ 355/50, 51, 64, 65, 66, 355/99; 95/89 A, 94 R

[56] References Cited
UNITED STATES PATENTS

| | | | |
|---|---|---|---|
| 2,606,478 | 8/1952 | Pratt et al. ............................ | 355/65 |
| 3,257,927 | 6/1966 | De Belder ............................ | 95/89 R |
| 3,490,843 | 1/1970 | Charlap et al. ...................... | 355/64 X |
| 3,567,344 | 3/1971 | Ogawa et al. ........................ | 355/51 X |
| 3,661,067 | 5/1972 | Aarnio ................................. | 95/89 A |
| 3,689,151 | 9/1972 | Hofmann et al. .................... | 355/64 |
| 3,690,758 | 9/1972 | Knechtel et al. .................. | 95/94 R X |
| 3,695,754 | 10/1972 | Washio et al. ...................... | 355/51 X |

*Primary Examiner*—Fred L. Braun
*Attorney, Agent, or Firm*—Alexander, Sell, Steldt & DeLaHunt

[57] ABSTRACT

A document flow camera for photographing a document driven in and out of the camera past an exposure station. The exposure station comprises a plate against which a document is driven by rollers to avoid edge flip as the leading and trailing edges move past the exposure station. Successive light images from the document are reflected from a mirror in the camera to a second adjustable mirror and from there it is reflected across the light path to a third reflecting member and then across the light path again into the objective lens which focuses the image onto the film. The film is driven by a capstan which is parallel with the axis of the rollers advancing the document through the exposure station. The adjustable mirror permits precise adjustment of the image reduction to compensate for variations in various elements of the camera in manufacture. The film is advanced by the capstan under the control of a drive system which is synchronized with the movement of the document. The control circuit drives the film in synchronism with a document moving through the camera for a predetermined time or multiples thereof or for a time determined by the length of the document. The control circuit also provides for advance of the film prior to removal of the film cassette, after insertion of a new film cassette and when power is applied to the camera. In addition, the control circuit provides a perceptable indication when the end portion of the film is presented and provides for the exposure of a portion of the film near one edge opposite each document being filmed. This exposed portion provides a mark on the developed film which can be used in a retrieval or film location apparatus.

7 Claims, 13 Drawing Figures

PATENTED JAN 21 1975
3,861,799
SHEET 1 OF 5
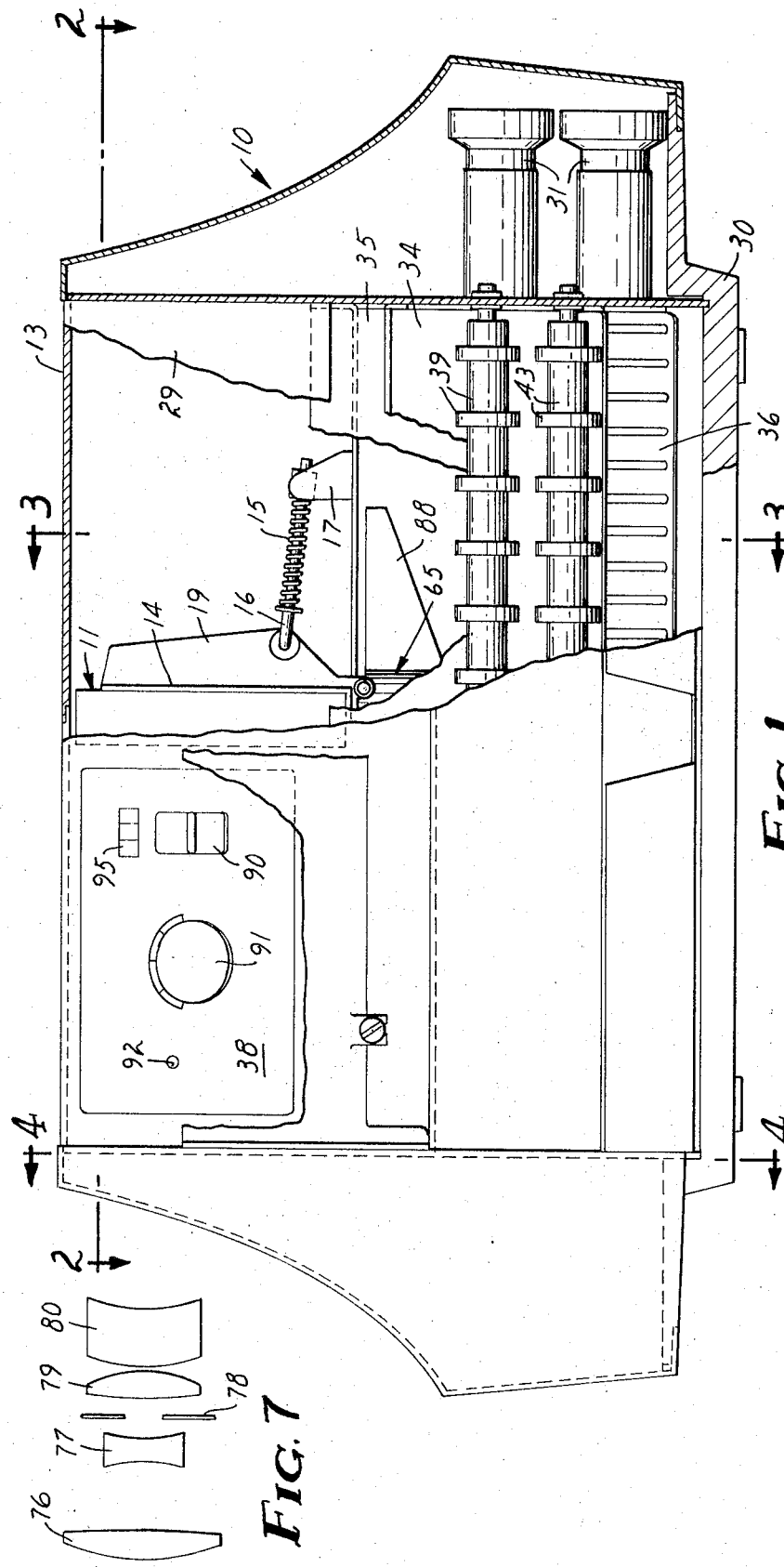
FIG. 1
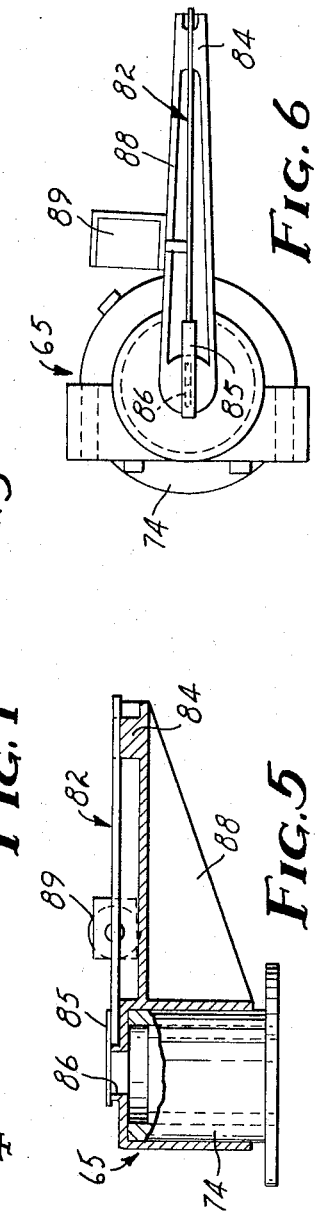
FIG. 6
FIG. 5
FIG. 7

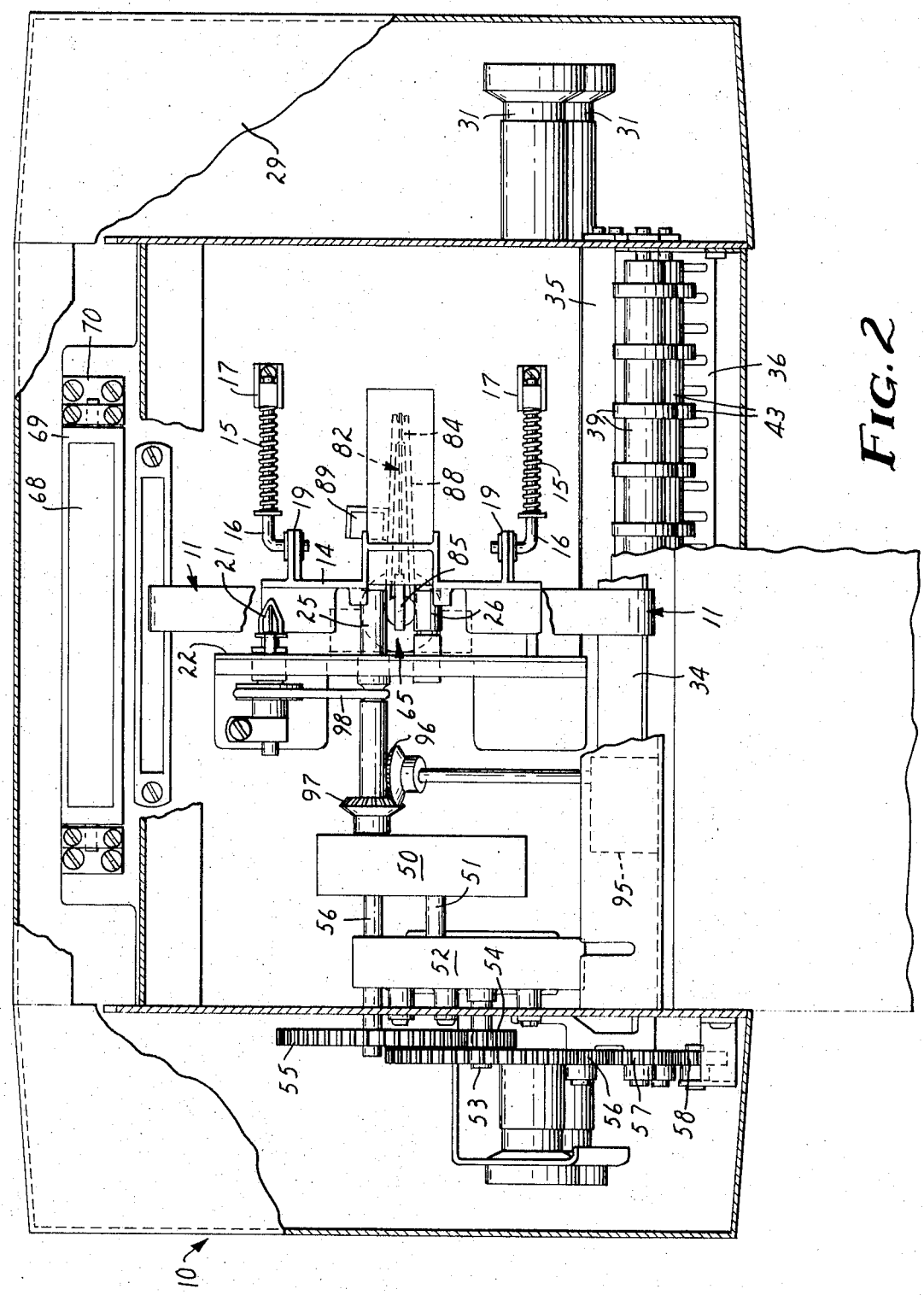

CAMERA

This invention relates to an improved document flow camera and in one aspect to an improved design which utilizes a small document handling and transport mechanism at the exposure station, a folded light path permitting adjustment of the length of the light path and the use of less expensive lenses, a cartridge supply for film to the camera and an improved control mechanism for film advancement.

Document flow cameras which have utilized a cartridge to supply the film are known in the art. This is one of the features however which lends to the simplicity of the camera of the present invention, plus the need for an easy-to-operate, versatile, light-weight camera with good resolution, high document speed and with two modes of operation.

BACKGROUND OF THE INVENTION

Cartridge document cameras in the prior art include those shown in U.S. Letters Pat. Nos. 3,010,361; 3,124,996; and 3,539,257.

Document cameras known in the prior art to include an adjustable mirror and an exposure station utilizing a flat plate over which rollers drive a document for incremental exposure are typically illustrated in U.S. Letters Pat. No. 2,411,694.

The camera shown in U.S. Pat. No. 3,124,996 or in U.S. Pat. No. 3,010,361 is not provided with a firm document supporting surface at the image plane and the leading edge and particularly the trailing edge of the documents are not held while being photographed. The light path in the prior known cameras is parallel or zigzag and not crisscrossed to provide the unique compactness of the camera of this invention. In U.S. Pat. No. 3,539,257 the document leading and trailing edges are not held at the exposure station, causing the edges to be in a different plane than the other portions of the document and therefore not in focus when photographed, and documents with paper clips, staples or folds may not always move through the exposure station satisfactorily.

Further, the document feed rollers of these prior art devices are continuously operating and the film drive is energized upon insertion of the document. This results in undue wear on the machine and waste of power since the document feed most often is intermittent.

U.S. Pat. No. 2,411,694 discloses a plate across which a document is moved by aligned rollers. The zigzag light path of this camera is adjustable by movement of a mirror for the purpose of synchronizing the lens ratio to a given gear ratio or operating speed of the camera but is primarily provided to afford variations in reduction to permit large engineering drawings or bank checks to be photographed with the same machine but at different reduction ratios.

The prior art thus fails to anticipate or suggest the features of the camera of the present invention which affords compactness, precision, and versatility.

Summary of the Present Invention

In the camera of the present invention the film and documents are driven from a single drive motor and the drive for the film and the drive for the documents are synchronized.

As an original document is placed into the camera its presence is sensed in the throat of the machine to energize the control circuit for the drive motor and lamps. When there is no document in the machine and drive motor and all other moving parts are stationary, thus reducing the wear on the machine and parts.

The circuit to control the present camera operates in two modes. In one mode called the trailing edge, the film will advance for a time determined by the length of the document. Thus, no more film is used than necessary to film the documents at a given reduction giving the maximum number of images in a roll of film. In this mode the leading edge of the document is sensed to turn the camera on and various components remain energized until a preset time after the trailing edge has been sensed. This delay after the trailing edge passes is adjustable, allowing the operator to set whatever space he wants between images on the film. This spacing will then be repeated until changed by the operator in this mode of operation.

In the second mode called the leading edge or framing mode, the leading edge of the document is sensed as it is moved into the camera with such sensing initiating a set time period for advancing a fixed amount systems film synchronously with the document entering the camera. In the event the trailing edge of the document has not been sensed prior to the end of the time period, the time period will be repeated. This mode is good for indexing systems where it is desired to have uniform frames along a length of the film, each frame or area carrying an image or part thereof. The time period for the framing mode of operation is adjustable.

The shutter used with the machine of this invention is solenoid operated. When energized, the solenoid moves the shutter to uncover a slot through which light passes, which slot is positioned between the lens and the film.

The optical path used in this camera is very long in that it is folded upon itself and the light crosses its own path twice in reaching the film exposing station. This long, narrow optical path allows the use of inexpensive lenses. The second mirror in the optical path is adjustable to adjust the path length and maintain good resolution at 24X reduction whether the parameters of some elements may vary or not. The long, narrow optical path and the longer focal length lenses give more depth of field in both the film and document planes.

The document feed system in the camera of the present invention eliminates the necessity of placing a transparent plate in the light path between the document and the objective lens and is so arranged that the leading and trailing edge of the document do not "flick," snap or tend to move during movement past the exposure station.

The document flow camera of the present invention provides a low cost, cassette-loaded document camera utilizing but 1/5 the parts utilized in other microfilming cameras of similar quality.

The document flow camera has a transport means for advancing a document past an exposure station where successive areas of the document are exposed to light. The exposure station is formed by a pair of parallel transport rollers between which is placed a plate against which the document is directed to hold the successive areas in a fixed plane during microfilming. The light from the document travels along a long light path between three reflecting members. The path crosses itself twice in getting the light image directly from the exposure station to the objective lens of the camera.

The image is then placed onto a film moving synchronously with the advance of the document. The camera can be operated to advance a fixed amount of film or multiples thereof each time the document is placed into the camera or can be operated so it advances a length of film determined by the length of the document. The control circuit also provides for the advance of the film prior to removal of a film cassette, after insertion of a film cassette and when power is applied to the camera.

DESCRIPTION OF THE DRAWINGS

The present invention will be more fully described hereinafter with reference to the accompanying drawing wherein:

FIG. 1 is a front elevational view of a document flow camera constructed in accordance with the present invention with portions thereof broken away to show interior elements of the camera;

FIG. 2 is a longitudinal sectional view taken along line 2—2 with portions thereof further broken away to show interior elements of the camera;

FIG. 5 is a vertical sectional view of the lens holder and shutter of the present invention;

FIG. 6 is a detail plan view of the shutter and lens holder;

FIG. 7 is a detail schematic view of the objective lens;

Figure 3:
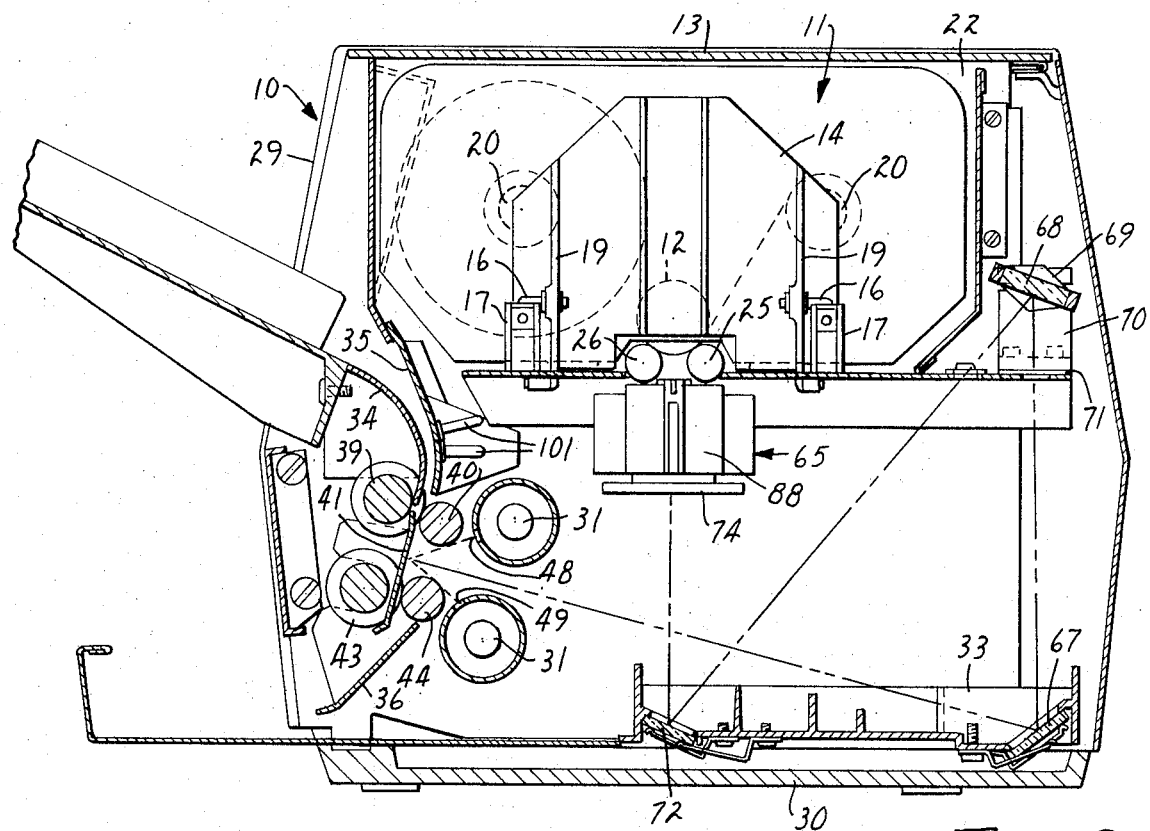
FIG. 3 is a vertical transverse sectional view of the camera of FIG. 1 taken along the line 3—3.
Figure 4:
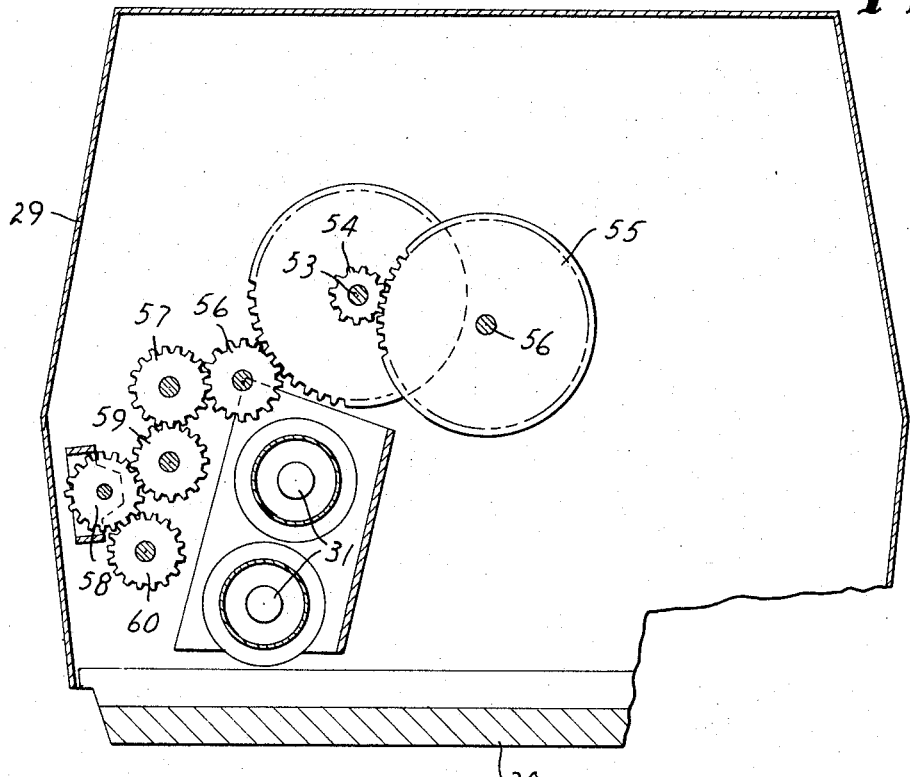
FIG. 4 is a vertical transverse sectional view taken along the lines 4—4 of FIG. 1.

Referring now to the drawing there is illustrated a camera 10 constructed in accordance with the present invention to photograph documents fed through the machine onto film supplied in a cassette 11. The cassette has a pair of spaced hubs 20 supporting a length of microfilm and it is guided over a spring biased roller 12 disposed adjacent an edge of the cartridge and defining the image plane for the exposure station. The cassette 11 is disclosed and claimed in a copending application filed in the name of Clarence O. McMaster on even date herewith and having a Ser. No. 326,885, filed Jan. 26, 1973.

The cassette 11 is inserted into the camera through a hinged cover 13. It is initially positioned on a hinged L-shaped platform 14 urged by compression springs 15, supported on rods 16, positioned between brackets 17 and gusset plates 19, to a vertical position as shown in FIG. 1. In the vertical position cassette 11 has one of the hubs 20 located on a driven spindle 21 (see FIG. 2) extending outward from a transverse wall 22 in the camera 10 which defines one wall of the film chamber.

The L-shaped platform 14 is movable against the compression of springs 15 from the generally vertical position shown in FIGS. 1 and 2 to a reclined position permitting the insertion and removal of a cassette 11. The roller 12 around which the film is moved between the hubs 20 is positioned adjacent the base of the L-shaped platform 14. With the cassette 11 in the vertical position the roller 12 is spring biased toward a drive capstan 25 and idler roller 26 which are positioned on either side of the light path directed toward the roller 12.

The camera 10 is otherwise formed with a housing 29 which fits on a base 30. The housing supports the various components of the camera including parallelly arranged fluorescent lamps 31 and suitable lamp brackets, a cast support frame 33 for supporting two of the mirrors defining the light path, guide plates 34 and 35 which define an inlet throat for directing the documents into the transport mechanism of the camera and a guide plate 36 defining the discharge chute for the documents. Supported also on the housing and base are the document transport mechanism, the objective lens assembly, and the drive mechanism for the documents and the film, together with the control system, which is operated from the control panel 38, all as will be described in detail hereinafter.

Referring first to the document transport system, a document is introduced between the guide plates 34 and 35 forming the inlet for the camera. In the throat defined by the guide plates 34 and 35 the documents move past a document detector 101 having sensors including five light emitting diodes-phototransistors combinations 125 for sensing the presence of a document in the camera. Each combination is positioned so light from the light emitting diode (LED) is directed for reflection from the document to the phototransistor as the document is inserted in the camera between rollers 39 and 40.

After the document has passed the sensors and the control circuit is energized, the document is grasped by a transport roller 39 and a first pressure roller 40, which rollers drive the document toward a plate 41 defining the object plane for the objective camera lens. From the plate 41 the document is moved between a second transport roller 43 and a second pressure roller 44 into the discharge guide plate 36.

The transport rollers 39 and 43 are disposed in a parallel relationship with their axis extending longitudinally of the machine at the front thereof and suitably supported at their ends. The axes are spaced a predetermined distance and each roller is formed with spaced document contacting surfaces permitting the plate 41 to have a document supporting surface disposed in a plane between the axis of the rollers and the outer surface of the rollers. The pressure rollers 40 and 44 are also formed with their axes parallelly disposed and suitably rotatably supported, but the axes of the pressure rollers 40 and 44 are not spaced apart a distance as great as the spacing of the transport rollers 39 and 43. The pressure rollers are also positioned such that a line through the axis of each transport roller and the axis of its associated opposed pressure roller will converge and intersect a line perpendicular to and intersecting the surface of plate 41 between the pressure rollers. This spacing of the rollers positions the pressure roller 40 with respect to the transport roller 39 such that the lead edge of a document moved between the rollers is directed against the surface of the plate 41.

The lead edge of the document is then held against the plate 41 until it is moved between the transport roller 43 and the pressure roller 44. The position of the pressure roller 44 with respect to the transport roller 43 is also such that the nip of the rollers maintain the document flat against the surface of the plate 41 and the document will be so held against the plate until the trailing edge of the document moves between the nip of the rollers 43 and 44.

The pressure rollers 40 and 44 have their surfaces spaced apart however a distance sufficient to define the exposure station. The lamps 31 are two photogreen fluorescent lights which provide longer life than incandescent lamps, a more constant output and a fixed color temperature. The lamps are disposed in shields which are formed with slotted openings 48 and 49 through which the light is directed against the surface of the plate 41 against which the documents are held. Thus as successive areas of the document are successively moved across the plate 41 the document is exposed to the light and a light image thereof will be formed.

Transport rollers 39 and 43 are both driven from a drive motor 50 (FIG. 2) of the camera 10. This drive from the motor is afforded through drive shaft 51, transmission 52 and the drive shaft therefrom 53. Connected to the drive shaft 53 is a first drive gear 54 which drives a gear 55 and a drive shaft 56 which is the drive shaft for the film drive capstan 25. The shaft 53 also drives a large gear which serves to drive a plurality of idler gears 56, 57 and 58, which in turn drive the gears 59 and 60 connected to the ends of the transport rollers 39 and 43. The gears are so formed that the transport rollers 39 and 43 are driven at the same speed in the same direction. The speed with which the transport rolls drive a document is about 750 inches per minute or a normal dry sheet of paper 8 ½ inches by 11 inches will move through the camera in 7/10 of a second. The planar surface of the plate 41 provides the image plane at the exposure station, thus no glass flats are used in the optical path at the exposure station, removing any cleaning problem since there will be no surface for dust to collect on. There will be no stray reflections or resolution reductions because of a glass flat. Originals with staples or frayed edges will go through the camera easily as they will all be directed down against the planar surface of the plate 41 and held there until they are lifted away by the other drive rollers. Edge "flip" or movement of either the leading or trailing edge of the documents is restricted as the documents go through the camera. Further, since filming occurs when the original is in the open space with only the flat black surface of the plate 41 behind the originals, there is no filming of drums or belts through the original if the original is thin and partially translucent and no filming of belts or rollers immediately before or after the original passes the exposure area occurs as in other cameras.

The pressure rollers 40 and 44 are supported on suitable members such that they may be spring-loaded toward the transport rollers 39 and 43. Thus, the different thicknesses of the originals or the presence of clips or staples in the originals will not cause destruction of the documents as they are moved through the camera. The light path from the exposure station to a lens assembly 65 includes a first mirror 67 extending longitudinally of the camera and at the lower rear edge which mirror 67 is mounted to direct an image from the exposure station upward along the back of the housing 29 to a second mirror 68. The second mirror 68 is rotatably mounted in a bracket 69, which bracket is mounted by bolts to a cast housing 70 forming a part of the frame of the camera. The mounting of the bracket 69 on the housing 70 may be adjusted by the use of shims 71 between the two, thus extending the distance between the mirrors 67 and 68. The mirror 68 is also mounted for rotation about its longitudinal axis to direct the image received from the mirror 67 to a third mirror 72. The third mirror 72 is a smaller mirror supported in fixed position on the casting 33 and is positioned to direct the image off of the mirror 68 into the lens in the lens barrel 74 of the lens assembly 65. The adjustment of the mirror 68 permits a variation in the length of the light path in the camera such that any variation in the parts as a result of manufacture or assembly can be adjusted in the light path to maintain a precise 24X reduction. The light path as best illustrated in FIG. 3 extends from the exposure station to the first mirror 67, from there along the back of the camera to mirror 68 and then the light path crosses itself to the third mirror 72 and again crosses its path to the lens barrel 74.

A 26.9 millimeter focal length F/5.6 lens is positioned in the lens assembly 65. This lens is best illustrated in FIG. 7 as a schematic view of the lens comprising a biconvex positive lens 76, a biconcave negative lens 77, an aperture stop 78 with a stop diameter of 4.17mm, a biconvex positive lens 79 and a positive meniscus lens 80. The lens barrel 74 for the lens is received in a housing 88 supporting the lens barrel 74.

The following table is presented showing for each lens element the radii of curvature R in millimeters, the axial thicknesses T of the lens element in millimeters, and the air spacings S between lens elements in millimeters. These values are all expressed in the customary manner, with the usual subscripts indicating the particular surface, lens thickness, or air space, numbered in sequence from front to rear of the lens assembly of FIG. 7. The plus and minus values of the radii R indicate surfaces respectively convex or concave toward the front, in accordance with conventional rotation. The respective refractive indices, expressed in reference to the spectral D line of sodium, are indicated by N, and the dispersive indices or Abbe numbers are indicated by V.

| LENS | $N_D$ | Y | RADII IN MM | THICKNESS IN MM |
|------|-------|------|-------------|-----------------|
| 76 | 1.61 | 58.6 | $R_1 = +12.7$ | $T_1 = 2.3$ |
|    |      |      | $R_2 = -390.3$ | $S_1 = 4.73$ |
| 77 | 1.68 | 31.0 | $R_3 = -14.1$ | $T_2 = 1.9$ |
|    |      |      | $R_4 = +11.8$ | $S_2 = 3.0$ |
| 79 | 1.62 | 57.0 | $R_5 = 93.4$ | $T_3 = 2.2$ |
|    |      |      | $R_6 = -10.8$ | $S_3 = 0.1$ |
| 80 | 1.62 | 57.0 | $R_7 = 13.6$ | $T_4 = 4.6$ |
|    |      |      | $R_8 = 15.7$ | |

The lens, lens barrel and housing also has assembled therewith a light shield or shutter 82 comprising a resilient wand which extends radially from the axis of the lens barrel 74 to a position where one end is cantilever mounted in a bracket 84. The free end of the wand has a shutter plate 85 positioned over a slotted aperture 86, which aperture is formed in the housing 88. The slotted aperture extends parallel to the axis of the roller 12 in the cartridge and transverse to the film path. A small coil or solenoid 89 is supported on the housing 88 to pull the wand from its normal position and the shutter plate 85 from over the aperture 86. The slotted aperture 86 is disposed between the drive capstan 25 and idler roller 26 which advance the film in the cassette. The capstan 25 drives the film from the supply spool and the take-up spool is driven by the spindle 21 to take up the exposed film and rewind it in the cassette. The hubs 20 in the camera are designed to have a restrained control such that they will not spill the film as it is taken from or wound on a hub upon the frquency stopping and starting of the film movement.

On the control panel 38 is positioned an on-off switch operated by the member 90, a control 91 for a variable potentiometer included in the light control circuitry 110 (FIG. 8) for controlling the lamp intensity, a window 92 in which is positioned one end of a light pipe which extends down to the lamps in the camera to indicate whether the series connected lamps are on or off, and a counter 95 which is driven from a beveled gear 96 engaging a beveled gear 97 on the drive shaft 56 which drives the capstan 25 and spindle 21. Spindle 21 is driven from the shaft 56 by a drive belt or O-ring 98 and slippage in this drive is permitted as the spindle 21 actually overdrives the takeup spool when in operation.

Figure 8:
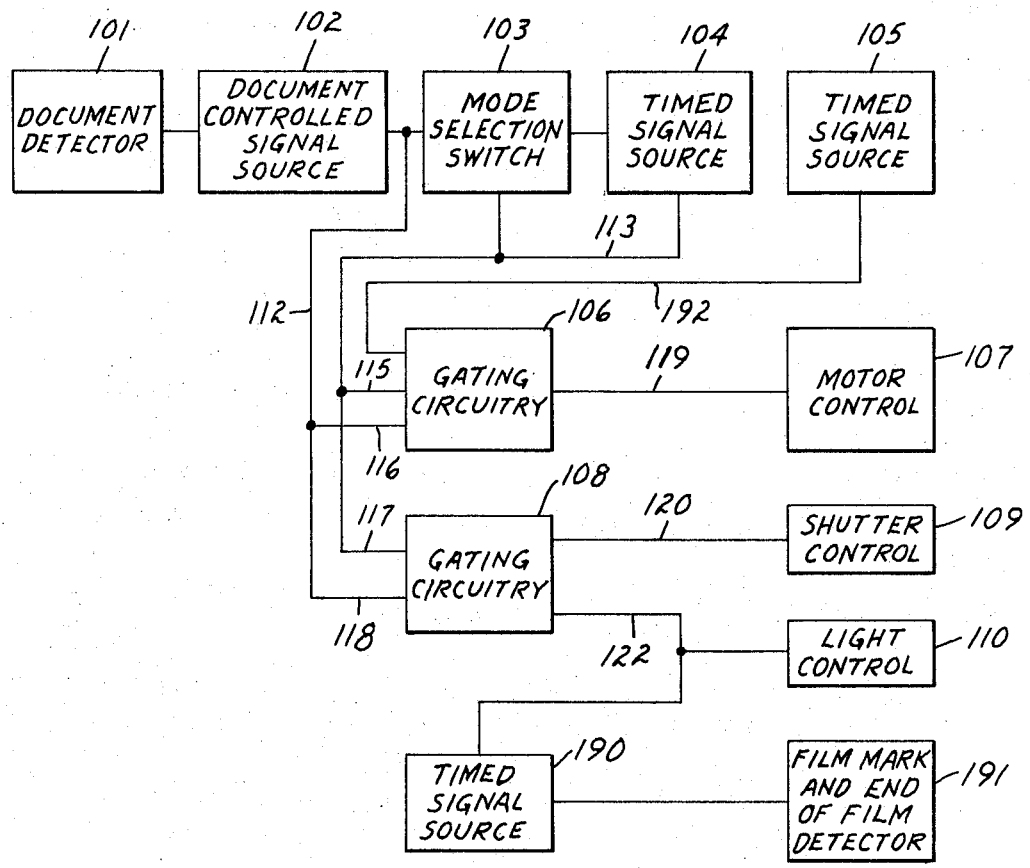
FIG. 8 is a block diagram of the control circuit for the camera.

The basic control circuitry for controlling the operation of the camera 10 is shown in FIG. 8 in block diagram form. This circuitry provides for operation of the camera 10 in either of its two modes, leading edge or framing mode and trailing edge mode. When the framing mode is used, the motor 50 is turned on when the leading edge of the document is sensed and remains on for a preset time period or multiples thereof to limit the film used to photograph a document to a fixed length of film or multiples thereof. The trailing edge mode is useful for filming small documents or documents of varying lengths. When used in the trailing edge mode, the motor 50 is turned on when the leading edge of the document to be filmed is sensed and remains on for a short time after the trailing edge passes the sensors of detector 101. The short time period for operation of the motor 50 following the passage of the trailing edge causes a fixed amount of film to be used after the trailing edge is sensed to provide adequate spacing of the documents on the film and provides time for movement of the document to a point where it can be removed from the camera 10.

The two modes of operation of camera 10 are provided by that portion of the circuitry shown in FIG. 8 which includes the document detector 101, the document controlled signal source 102, the mode selector switch 103, the timed signal source 104, the gating circuitry 106, the motor control 107, the gating circuitry 108, the shutter control 109, and the light control 110. Signals are obtained from two sources for either of the two modes of operation for controlling operation of the motor control 107, the timed signal sources 104, the shutter control 109, and the light control 110. The two control signal sources are the document controlled signal source 102 and the timed signal source 104. A control signal from the document controlled signal source 102 is produced in response to the output of the document detector 101 and appears on conductor 112 which connects with inputs 116 and 118 of gating circuits 106 and 108, respectively. A control signal from timed signal source 104 appears on conductor 113 and is applied to inputs 115 and 117 of gating circuits 106 and 108, rspectively. The gating circuit 106 provides an output signal to the motor control 107 via the conductor 119 while gating circuit 108 provides an output signal at 120 for the shutter control 109, and at 122 for the light control 110.

When a document is inserted into the camera 10, the document detector 101 responds to the leading edge of the document to provide an input signal to signal source 102 causing the source 102 to provide a control signal on conductor 112 which continues until the trailing edge of the document passes the sensors in the document detector 101. The gating circuits 106 and 108 respond to the control signal on conductor 112 by providing signals for initiating the operation of motor control 107, shutter control 109 and light control 110.

If the mode selection switch 103 is positioned for the framing mode of operation, a signal similar to the signal presented on conductor 112 from signal source 102 is produced by the timed signal source 104 in response to the signal on conductor 112 which is applied to signal source 104 via switch 103. A control signal from source 104 appears on conductor 113 for presentation to gate circuitry 106 and 108 for a period of time and is repeated in the event the control signal on conductor 112 is still present at the end of the timed period. Normally, a single time period provided by source 104 will be long enough for filming a standard size document and providing spacing on the film between successive documents. The control signal from signal source 102 presented to conductor 112 is changed by the passage of the trailing edge of the document at the sensors in the document detector 101. When this occurs, the control signal presented to gating circuits 106 and 108 on conductor 113 from signal source 104 continues only for the timed period then in progress.

The control signal presented on conductor 112 in response to detection of a document in camera 10 causes the gate 106 to present a signal which is effective to initiate operation of the motor control 107 to energize the drive motor 50 which drives the film cassette. The signal on conductor 112, which is also presented to the gate 108, causes gate 108 to present a siganl to shutter control 109 to cause it to operate to move the shutter to permit the passage of light to the film. The operation of the light control 110 is also controlled by an output signal from gating circuitry 108. Since the signal presented on conductor 113 from the timed signal source 104 to gates 106 and 108 is similar to the signal presented from signal source 102 and continues beyond the time such signal is presented from the source 102, the motor control 107, the shutter control 109 and light control 110 continue to be energized until the termination of the signal provided by the timed signal source 104.

When the mode selection switch is positioned to place the circuit in the trailing edge mode of operation, the document detector 101 operates in the same manner as described in connection with the framing mode of operation except that the timed signal source 104 is not placed in operation by the control signal presented on conductor 112 in response to the detection of a document inserted into the camera 10. The timed signal source 104 is triggered, however, in response to the change in the control signal presented at conductor 112 which occurs when the trailing edge of the document passes the sensors in document detector 101 to cause a timed control signal to be presented on conductor 113 following detection of the trailing edge of the document by detector 101 which is effective to cause the motor control 107, the shutter control 109 and light control 110 to continue operation for the duration of the timed control signal provided by the signal source 104. The timed control signal provided by source 104 for the trailing edge mode is shorter in duration than that provided for the framing mode since it is used to provide movement of the film only a short distance following detection of the trailing edge of the document and provide for movement of the document to a point where it can be removed from the camera 10.

Figure 9:
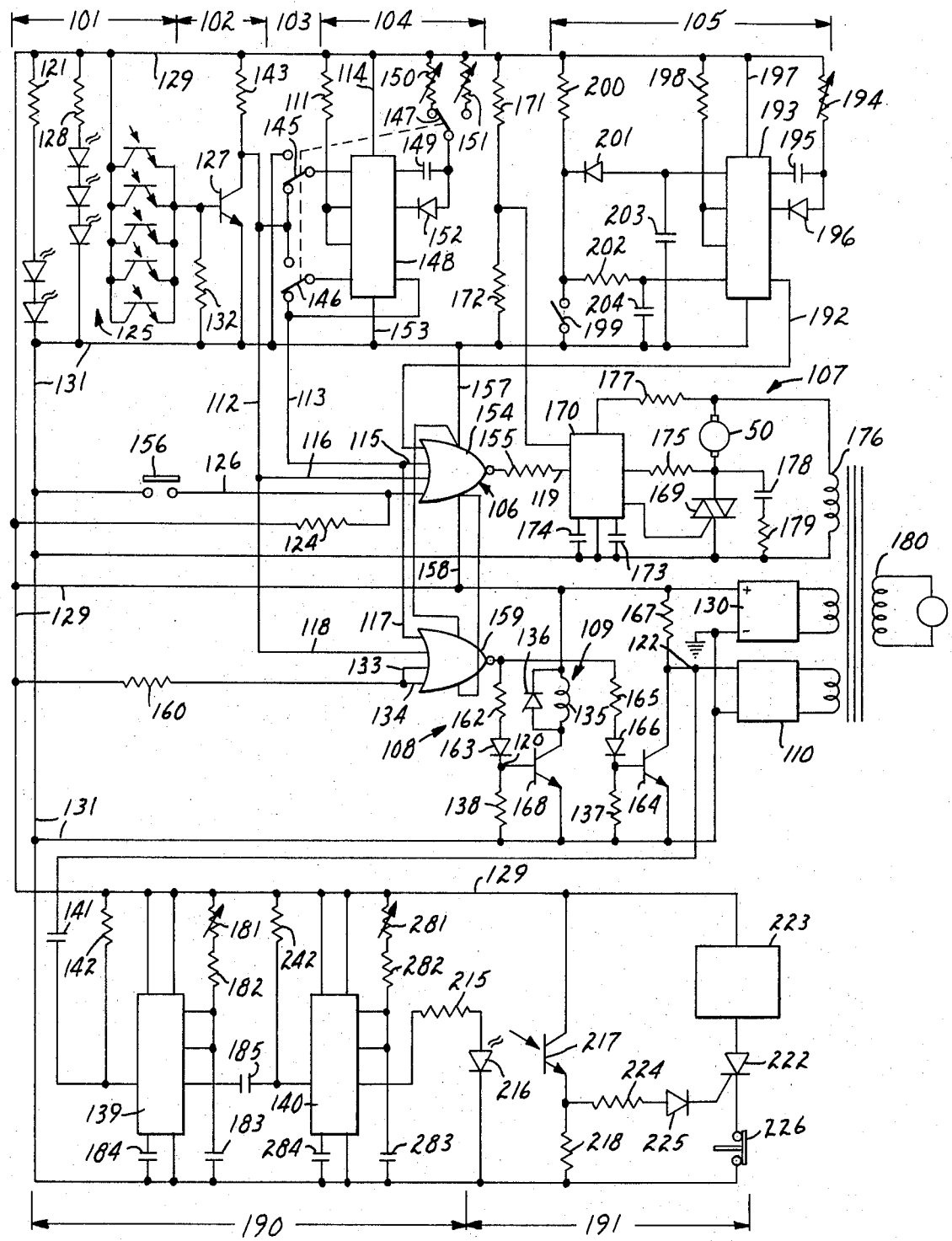
FIG. 9 is a schematic showing of the control circuit of FIG. 8.

Prior to considering the remaining portions of the circuitry shown in FIG. 8, a description of the details of the circuit portions of FIG. 8 that have been discussed will be given. Reference is made to FIG. 9 which sets forth a schematic circuit of the control circuitry for operation of the camera 10. The circuitry for the document detector 101 includes an array 125 of five light emitting diode-phototransistor combinations connected to the document controlled signal source 102 which includes a transistor 127. Each of the light emitting diode-phototransistor combinations in the array 125 is physically positioned so the light from the light emitting diode of a combination is directed for reflection from the document to the phototransistor of the combination as the document is inserted into the camera 10. In the circuit shown in FIG. 9, a 5 volt d.c. source 130 is used which requires three of the five light emitting diodes to be connected in series with a resistor 128 with such combination connected between a conductor 129 and a common ground path 131. The remaining two light emitting diodes are similarly connected using a resistor 121. The conductor 129 is connected to the positive terminal of the direct voltage source 130. The phototransistors are connected in parallel with their collector electrodes connected to the conductor 129 and their emitter electrodes connected to conductor 131 via a resistor 132. Light emitting diodes which operate in the infrared ranges have been found to be the most satisfactory type to use in this arrangement. The number of light emitting diode-phototransistor combinations 125 is not critical. Five combinations have been provided to assure immediate detection of a document.

The output of the document detector 101 appears at the common connection for the emitters of the phototransistors and resistor 132 and is applied to the base electrode of transistor 127. The transistor 127 is an NPN type transistor so its emitter electrode is connected to the ground conductor 131 and its collector electrode is connected via resistor 143 to the positive voltage provided on conductor 129. The output for the document controlled signal source 102 is obtained from the collector electrode of transistor 127.

Prior to the insertion of the document into the camera 10, none of the phototransistors in the sensor array 125 in the detector 101 is conducting. When a document is inserted into the camera 10, the leading edge of the document is detected by one or more of the five light emitting diode-phototransistor combinations causing the transistor 127 to conduct. Prior to conduction of the transistor 127, the voltage at the collector electrode is the direct voltage level presented on the conductor 129. When transistor 127 conducts, the voltage at the collector will drop to a low level to provide a control signal on conductor 112 for so long as the document is presented to the sensor array 125.

The mode selector switch 103 includes three ganged single pole-double throws switches 145–147 which in FIG. 9 are shown positioned for the framing mode. The lower fixed contact of switch 145 and the upper fixed contact of switch 146 are connected to the conductor 112. The lower fixed contact of switch 146 is connected to the output conductor 113 of the timed signal source 104. The upper fixed contact of switch 145 is connected to the ground conductor 131. The switch 147 is connected with the timed signal source 104 for changing of the RC time constant of source 104 in accordance with the mode of operation selected. The switch 103 is shown positioned for the framing mode of operation.

Figure 11:
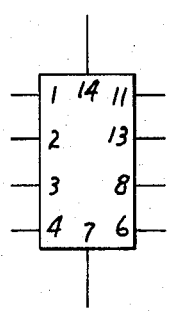
FIG. 11 is a block diagram showing (with terminal reference numerals) of a commercially available one-shot multivibrator circuit used in FIG. 9.

Retriggerable monostable multivibrator integrated circuits may be used for the timed signal sources 104 and 105. One such unit that is suitable is available from the Fairchild Semiconductor Division of the Fairchild Camera and Instrument Corporation, Mountain View, Calif., under the commercial designation MC9601. Details regarding the unit are contained in an application note published by the manufacturer dated August, 1970 and in data sheets published by the manufacturer. FIG. 11 identifies the various terminals of a Fairchild unit using the same reference numerals as are used in the data sheets for the commercial units. The terminals as shown in FIG. 11 correspond to those used for the MC901 type circuits shown in block form in FIG. 9.

The timed signal source 104 includes a Fairchild MC9601 retriggerable monostable multivibrator 148. The multivibrator unit 148 is used with two RC circuits, one of which is connected to the multivibrator 148 when the switch unit 147 of mode selector switch 103 is positioned for the framing mode of operation with the other RC circuit being connected to the multivibrator 148 when the switch 147 is in the trailing mode position. A capacitor 149 is common to the two RC circuits. The capacitor 149 has one side connected to the movable contact of switch 147 with the other side connected to the multivibrator unit 148. A variable resistor 150 is included in one of the RC circuits and is connected between the common conductor 129 and the framing mode fixed contact of switch 147. A second variable resistor 151 is included in the other RC circuit connected between the common conductor 129 and the trailing mode fixed contact for switch 147. A diode 152 is connected between terminal 13 of the multivibrator 148 as identified in FIG. 11 and the movable contact of switch 147. The cost of capacitor 149 is reduced by the use of the diode 152 which allows the capacitor 149 to have more leakage than would be allowed if the capacitor were without a diode. If the diode 152 is not used, a direct connection to the multivibrator 148 is made in place of the diode 152. The multivibrator 148 is connected to the ground conductor 131 via the conductor 153 and to the direct voltage supply conductor 129 via conductor 114. The input terminal 1 for multivibrator 148, as identified in FIG. 11 is connected to the movable contact of switch 145, while input terminal 4 per FIG. 11 is connected to the movable contact of switch 146. The other two input terminals of unit 148 are connected to the positive voltage conductor 129 via a resistor 111. The multivibrator unit 148 has two output terminals with the signal at one being the inverse of the other. Only output terminal 6 per FIG. 11 is utilized for the timed signal source 104 and is connected to the conductor 113.

The voltage on conductor 113 drops when the multivibrator 148 is triggered by the appropriate input signal applied to the input terminal connected to switch 145 or the input terminal connected to switch 146. The multivibrator 148 will be triggered by a negative going pulse presented via switch 145 so long as a high voltage level is present at the other three input terminals. It is also possible to trigger the multivibrator 148 as shown by having a low level voltage signal presented to the input terminal connected to switch 145 when a low to high voltage level transition signal is applied to the input terminal connected to switch 146. As has been explained, a high to low transition signal is presented at the collector of transistor 127 when a document is initially detected by the detector 101. Thus, with the mode selection switch 103 positioned for the framing mode operation (Switches 145–147 as shown in FIG. 9) a high to low voltage level transition signal presented to the multivibrator 148 from the collector of transistor 127 causes the multivibrator 148 to be triggered since the other three input terminals are then presented with a high voltage level. Upon triggering of the multivibrator 148, a high to low voltage level transition signal is presented at the output conductor 113 with such signal continuing for the period of time determined by the RC circuit including resistor 150 and capacitor 149. At the end of the timed period, the multivibrator 148 presents a low to high voltage level transition signal to the output conductor 113. If the trailing edge of the document has passed the light emitting diode-phototransistor array 125 prior to the end of the timed period, the collector of transistor 127 presents a high voltage level causing the voltage on the output conductor 113 of multivibrator 148 to remain at a high level. However, if the document is still being detected by the array 125, the low level voltage continues to be presented to the multivibrator 148 from the collector of transistor 127 which with the low to high voltage level transition signal on conductor 113 presented to the input terminal of the multivibrator 148 via the switch 146 causes the multivibrator 148 to again be triggered to repeat the timed period. This retriggering of the multivibrator 148 continues until the trailing edge of the document has passed the array 125 to terminate conduction of transistor 127 prior to the end of a timed period provided by source 104. A voltage signal from the collector of transistor 127 is then presented to the multivibrator 148 via the switch 145 prior to the end of the timed period so that multivibrator 148 will not be retriggered by the low to high level transition signal present at the output conductor 113 at the end of the timed period.

The framing mode of operation will generally be used when filming a number of documents of a given size. The resistor 150 is adjustable making it possible to adjust the timing period provided by the timed signal source 104 for the framing mode. This adjustment makes it possible to have the documents spaced on the film in a manner convenient for mounting the film in microfiche form and to also minimize the amount of film used to photograph documents of a fixed size.

FIG. 9 shows switches 145–147 in position for the framing mode. When switches 145–147 are operated to place their movable contacts in contact with the other stationary contact, the circuit is then conditioned for the trailing mode of operation. Two of the input terminals to the multivibrator 148 remain connected to the direct voltage via conductor 129. The upper input terminal is then connected to the ground conductor 131 and the lower input terminal is connected to the collector of transistor 127. The MC9601 Fairchild type multivibrator 148 will then be triggered when a low to high transition signal is presented to the lower input terminal from the collector of transistor 127. A low to high transition signal is presented at the collector of transistor 127 when a document being detected passes the light emitting diode-phototransistor combinations 125 causing the transistor 127 to cease conducting. This low to high transition signal is presented to the lower input terminal multivibrator 148 causing it to be triggered to present a control signal on conductor 113 having a duration determined by the RC circuit which includes resistor 151 and capacitor 149. Resistor 151 is adjustable making it possible to adjust the timing period provided for the trailing mode of operation.

Figure 12:
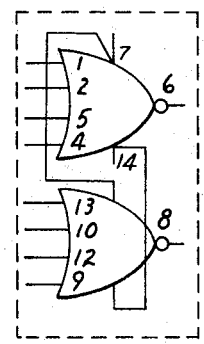
FIG. 12 is a block diagram showing (with terminal reference numerals) of a commercially available dual NOR gate circuit used in FIG. 9.

The gating circuitry 106 and 108 include NOR gates 154 and 159, respectively, which may be obtained from a dual NOR gate integrated circuit sold under the designation $\mu$A7420 by the Fairchild Semiconductor Division of the Fairchild Camera and Instrument Company. This unit has two NOR gates formed on a single silicon chip. FIG. 12 shows the Fairchild unit with the various terminals indicated using references corresponding to those used in connection with the actual units sold and to the connections shown in FIG. 9 for NOR gates 154 and 159. The upper unit in FIG. 12 corresponds to the gate 154 of FIG. 9 and the lower NOR gate in FIG. 12 corresponds to the NOR gate 159 in FIG. 9.

The gating circuitry 106 includes the NOR gate 154. It has four input terminals and an output which is applied to conductor 119 via a resistor 155. The conductor 119 connects to the input of the motor control circuit 107. The input 115 of the NOR gate 154 is connected to the output conductor 113 of the timed signal source 104 while another input 116 to the NOR gate 154 connects with the conductor 112 connected to the output of the document controlled signal source 102. A third input 126 is connected to the ground conductor 131 via a manually operated switch 156 and to the positive side of voltage source 130 via resistor 124. The switch 156 is manually operated to provide an input to the NOR gate 154 to cause the motor control 107 to be operated and is provided to facilitate repair or maintenance of the apparatus. The terminal 7 per FIG. 12 for NOR gates 154 and 159 is connected to the ground conductor 131 via a conductor 157 while terminal 14 per FIG. 12 is connected to the positive side of the voltage source 130 via conductor 158.

NOR gate 159 of gating circuit 108 has one input 117 connected to the output of the timed signal source 104 with another input 118 connected to the output conductor 112 for the document controlled signal source 102. The remaining two input terminals 133 and 134 of the NOR gate 159 are connected to the direct voltage conductor 129 via a resistor 160. If a low input signal is presented at only one input terminal, the output of the NOR gate 159 will be high.

The gating circuit 108 includes an NPN type transistor 164 which is controlled by the output of NOR gate 159. The output 122 for the gating circuit 108 is provided at the collector of transistor 164 and connects with the light control 110. The transistor 164 is controlled by the output of NOR gate 159. A resistor 165, diode 166 and resistor 137 are connected in series between the output of NOR gate 159 and ground conductor 131 with the base of transistor 164 connected to the connection common to diode 166 and resistor 137. The emitter of transistor 164 is connected to ground conductor 131 with the collector electrode connected to the positive voltage supply terminal via resistor 167. When a negative going pulse is applied to the NOR gate 159 from the collector of transistor 127 of the document controlled signal source 102 or when such a signal is presented to the input of NOR gate 159 connecting with the output of the timed signal source 104, the NOR gate 159 presents a positive going pulse at its output which is applied to the base of transistor 164 causing it to conduct to present a negative going pulse at its collector connected to the light control circuit 110 to initiate the operation of the light control circuit 110, which controls the operation of the fluorescent lamps 31 (FIG. 3). The circuit 110 is energized when transistor 164 of the gating circuit 108 is made conductive. The light source for the camera 10 could also be one that is turned on when the apparatus is turned on and remains on until the apparatus is turned off. the arrangement shown in FIG. 9 will provide longer life for the light source in that it is controlled by the gating circuit 108 and is therefore only turned on upon insertion of a document into the camera and is turned off when the time provided for filming of the document is completed.

The gating circuit 108 also includes resistor 162, diode 163 and resistor 138 which are connected between the output of NOR gate 159 and the ground conductor 137. The connection common to diode 163 and resistor 138 provide the output 120 for gating circuit 108 which connects with the shutter control 109. The shutter control 109 includes an NPN type transistor 168 which has its base connected to the output 120 and has its emitter connected to the ground conductor 131. The shutter control 109 includes a solenoid which has its winding 135 connected between the collector of transistor 168 and the positive side of the direct voltage source 130. A diode 136 is connected across the winding 135. The shutter control 109 is energized when a positive going signal is presented to the base of transistor 168 from the output of NOR gate 159 and remains energized so long as that signal is presented to the base of transistor 168.

Figure 13:
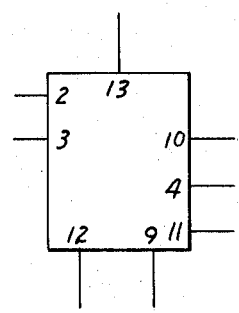
FIG. 13 is a block diagram showing (with terminal reference numerals) of a commercially available zero crossing AC triggering circuit used in FIG. 9.

The motor control 107 for the motor 50 includes a bidirectional semiconductor switching device such as a triac 169 which has one side connected to one side of the motor 50. The other side of triac 169 is connected to the ground conductor 131. The triac 169 is connected to be triggered by a zero crossing AC trigger circuit 170 designed as a drive for triacs and SCR's. Trigger pulses are provided at the zero crossing of the load current to minimize radio frequency interference generation. One such circuit that can be used for this purpose is sold under the designation μA742 by the Fairchild Semiconductor Division of the Fairchild Camera and Instrument Corporation. FIG. 13 shows the reference numbers for the Fairchild unit which correspond to the reference numerals used in connection with the actual unit sold and correspond to the connections shown for the AC trigger circuit 170 in FIG. 9. Thus, terminal 2 of the zero crossing AC triggering circuit 170 is connected to a voltage divider provided by the series connected resistors 171 and 172. Resistor 171 is connected to the direct voltage provided on conductor 129 and resistor 172 is connected to the ground conductor 131. The output of the gating circuit 106 connects with the terminal 3 of the triggering circuit 170. Terminal 8 is connected to ground conductor 131. Terminals 9 and 12 of the triggering circuit 170 are connected to ground conductor 131 via capacitors 173 and 174, respectively. Terminal 11 which provides the trigger output is connected to the gate electrode of triac 169. Terminal 10 of the circuit 170 is a sync input that is connected via resistor 175 to the connection common to motor 50 and triac 169. The voltage supply terminal 13 of circuit 170 is connected to one end of the secondary transformer winding 176 via a resistor 177. The side of motor 50 away from triac 169 is connected to the connection common to the resistor 177 and the secondary winding 176. The motor control circuit 107 also includes a series connected capacitor 178 and resistor 179 connected to ground and across the triac 169. This circuit is one that is normally used with a triac 169 connected to an inductive load.

Referring once again to FIG. 8, it will be noted that the timed signal source 190 and the film mark and end of film detector 191 shown at the bottom of FIG. 8 and the timed signal source 105 appearing in the right hand corner of FIG. 8 have not been discussed. The timed signal source 105 connects to an input of the gating circuit 106 which has its output connected to the motor control 107. When the timed signal source 105 is triggered, a signal is presented to the motor control 107 for a period of time to cause motor 50 to be operated to move the film a short distance. A distance of approximately three inches has been found to be satisfactory. The timed signal source 105 is triggered whenever electrical power is applied to the apparatus and is also triggered whenever the door providing access to the film cassette is opened or closed.

If the camera has not been used for some time, there is a possibility that the film to be presented for exposure may have been exposed to some degree. It is therefore desirable that the film cassette be driven for a short time so that fresh film will be presented for photographing a document. For this reason, the timed signal source 105 is arranged to be triggered upon application of power to the camera circuitry. It is also desirable that a film cassette be operated for a short time just before being removed to move the last portion of the film exposed to a point well inside the film cassette where it will not be subjected to possible exposure by ambient light. It is desirable too that the film cassette be operated for a short time after it is placed in position so fresh or unexposed film will be presented when the camera is operated in response to a document being inserted for filming. The timed signal source 105 is therefore arranged to be triggered in response to opening and closure of the door providing access to the film cassette.

The timed signal source 190 and the film mark and end of film detector 191 are used to expose a small portion of the film at one edge whenever a document is filmed and is used to detect the end of the film and provide a signal to the operator to indicate that the end of the film has been detected.

The circuit details for the timed signal source 105 are shown in the upper right hand portion of FIG. 9, and include a retriggerable monostable multivibrator 193 which may be of the same type as is used for the multivibrators 148 of the timed signal source 104. Reference should therefore be made to FIG. 11 which shows the terminals for such devices. An RC circuit including resistor 194 and capacitor 195 and diode 196 is connected to multivibrator 193 to determine the length of the timed period provided by the timed signal source 105 and is connected in the same manner as the RC circuit for multivibrator 148. The output terminal 6 of the multivibrator 193 is connected by conductor 192 to an input terminal 1 (FIG. 12) of the gating circuit 106. The multivibrator 193 is connected to the direct voltage conductor 129 via a conductor 197 and has its terminal 7 connected to the ground conductor 131. The input terminals 2 and 3 of the multivibrator 193 are connected to the direct voltage conductor 129 via the resistor 198. The triggering circuit for the multivibrator 193 includes a switch 199 which is positioned in the camera apparatus for operation whenever the access door is opened or closed. The switch 199 may be of a type that is either normally closed or normally opened when the access door is closed. As has been indicated, the timed signal source 189 is triggered whenever the switch 199 is operated in response to the opening and closing of the access door to the film cassette and is also triggered when power is applied to the camera 10. The triggering circuit for the multivibrator 193 includes the switch 199 which has one side connected to the ground conductor 131 with the other side of the switch connected to the direct voltage conductor 129 via a resistor 200. In addition, the switch connected end of resistor 200 is also connected to terminal 1 of the multivibrator 193 via a diode 201 which has its anode connected to the terminal 1. The switch end of resistor 200 is also connected to terminal 4 of the multivibrator 193 via a resistor 202. The triggering circuitry also includes capacitors 203 and 204 which are connected between the ground conductor 131 and terminals 1 and 4, respectively, of the multivibrator 193.

Circuit details of the timed signal source 190 and the film mark and end of film detector 191 are shown at the bottom of FIG. 9.

The timed signal source 190 provides a short timed period following detection of the leading edge of a document for energizing a light emitting diode 216 to expose a small portion of the film along its edge which can be used for locating purposes after the film has been processed and is used with a film reader.

Figure 10:
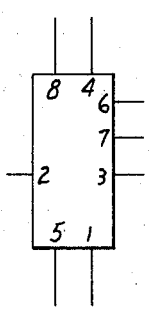
FIG. 10 is a block diagram showing (with terminal reference numerals) of a commercially available integrated timing circuit used in FIG. 9.

The timed signal source 190 can take on many forms. FIG. 9 sets forth one exemplary circuit for source 190. It includes two timing circuit modules 139 and 140 connected in cascade. Module 139 receives an input signal from the output 122 of gating circuitry 108 via a capacitor 141. The modules 139 and 140 can be integrated timing circuits available from Signetics Corporation, Sunnyvale, Calif., under the designation NE/SE 555. FIG. 10 shows the terminal designations assigned to the commercially available units which are used for connecting the two modules together and to the circuit components required for the timing operation. Referring first to module 139, the input capacitor 141 is connected to terminal 2. A resistor 142 is connected between terminal 2 and conductor 129 which connects with the positive side of the power supply 130. Terminals 4 and 8 are also connected to the conductor 129. A resistive portion made up of series connected resistors 181 and 182 plus capacitor 183 determine the length of the time delay for the module 139. Resistor 181 is variable so the time delay can be adjusted as required. Resistor 181 is connected to conductor 129 while capacitor 183 connects to the common ground conductor 131. The connection common to resistor 182 and capacitor 183 connects with terminals 6 and 7 of module 139. Terminal 1 of module 139 is connected directly to the ground conductor 131 while terminal 5 is connected to conductor 131 via a capacitor 184. The output for module 139 appears at terminal 3 which is connected to the input terminal 2 of module 140 via a capacitor 185. The module 140 is connected in the same manner as module 139 and the same type of components. These components are identified using same reference numerals but increased by a factor of 100. The output terminal 3 of module 140 is connected via a resistor 215 to the anode of a light emitting diode 216 for the film mark and end of detector 191 which has its cathode connected to ground conductor 131.

The timed signal source 190 shown in FIG. 9 provides a delay determined by the module 139 circuitry portion which is initiated by the detection of the leading edge of a document being filmed. This delay seves to position the beginning of the mark placed along the edge of the film in relation to one edge of the document as it appears on the film. Upon completion of this delay, the module 140 circuitry operates for a period of time determined by resistors 281, 282 and capacitor 283 to cause light emitting diode 216 to conduct. The diode 216 is positioned at the edge of the film. This period of time determines the length of the film that is exposed to establish the mark at edge of the film for each document that is filmed.

In the event it is acceptable to have the mark on the edge of the film being at that same time, the leading edge of a document being filmed is detected, the module 139 circuitry can be eliminated with the output 122 of gating circuitry 108 connected to the input of module 140 via the capacitor 185.

The film mark and end of film detector 191, in addition to the light emitting diode 216, has a light responsive device 217, such as a phototransistor, positioned adjacent the diode 216. The light emitting diode 216 and the phototransistor 217 can be conveniently formed on a single semiconductor chip as is the case of the light emitting diode and phototransistor combinations 125 used in the document detector 101. The light transmitted by the light emitting diode 216 is directed toward an outer edge of the film which passes adjacent the light emitting diode 216 and the phototransistor 217. As has been indicated, the light from the light emitting diode 216 will normally cause the film to be exposed at the edge toward which the light from the diode 216 is directed for a time determined by the timed signal source 190. In order that the end of the film can be detected, a white line is provided near the end of the film and along the edge of the film where the light from the light emitting diode 216 is directed. If this white line is present at the time the light emitting dioide 216 is energized, the light from diode 216 is reflected from the white line to the phototransistor 217 causing it to conduct. The emitter of phototransistor 217 is connected to ground via a resistor 218 causing an output signal to be developed across the resistor 218 when phototransistor 217 is conducting.

The remainder of the circuit for the film mark and end of film detector 191 responds to the output of the phototransistor 217 to provide a perceptible indication. The operator is thus made aware of the fact that the end of the film has been detected and that a new film cassette should be placed in the apparatus. An exemplary circuit is shown in the disclosed embodiment for providing a perceptible indication includes a semiconductor switching device, such as a silicon controlled rectifier (SCR) 222, which can be turned on and remains on in response to the momentary conduction of the phototransistor 217, so the perceptible indication will remain until terminated by the operator. The SCR 222 is connected to a device 223 for providing the desired indication. The device 223 may be any one of a number of commercially available devices which will produce an audible sound when energized or, if desired, may be a device that will produce a visual indication or a device that can be selectively operated to provide either a visual or audible indication or both. The SCR 222 is connected via a resistor 224 and diode 225 to the emitter of phototransistor 217. The anode of SCR 222 is connected to the device 223 while its cathode is connected to ground conductor 131 via a normally closed switch 226. The switch 226 is momentarily opened to turn the SCR 222 off when an indication from device 23 is noted and it is desired that it be terminated.

In addition to components already identified listed below are typical component values and types for the remaining circuit elements shown in FIG. 9 that can be used to construct the circuit of FIG. 9. Light emitting diode — phototransistor combinations 125 and 216, 217 — available from Sensor Technology, Chatsworth, Calif.

C103 (G.E.) - SCR 222
SC141 (G.E.) - Triac 169
1 Amp. Diode - Diode 136
FD600 (Fairchild) - All diodes except 136
2N3565 - Transistor 127
D40C (G.E.) - Transistor 168
MPS 29.25 (Fairchild) Transistor 164
Variable resistance 150, 151 and 194 - 5K ohm resistor plus a 50K ohm potentiometer.
82 ohms - Resistors 121, 128
100 ohms - Resistor 179
1K ohms - Resistors 137, 138, 155, 162, 165, 200, 202
1.5K ohms - Resistor 172
3.5K ohms - Resistor 171
4.7K ohms - Resistor 143
5.6K ohms - Resistors 111, 124, 160, 167, 198
10K ohms - Resistors 175, 177, 182, 224, 281, 282
10K ohms - Potentiometer 181
27K ohms - Resistors 142, 242
100K ohms - Resistors 132, 215, 218
0.01 microfarads- Capacitors 141, 184, 185, 203, 204, 284
0.1 microfarads- Capacitors 174, 178
2 microfarads - Capacitor 173
10 microfarads - Capacitor 283
47 microfarads - Capacitors 149, 183
100 microfarads - Capacitor 195

The particulars of the foregoing description are provided merely for the purpose of illustration and are subject to a considerable latitude of modification without departing from the novel teachings disclosed therein. Accordingly, the scope of this invention is intended to be limited only as defined in the appended claims, which should be accorded a breath of interpretation consistent with this specification.

What is claimed is:

1. In a document flow camera having a transport including drive means for advancing a document into the camera past an exposure station and exiting the document, means for synchronizing the movement of a film upon advancement of the document to photograph successive image areas of the document at the exposure station onto the film at a focal plane, and lamp means for exposing to light the successive areas of the document as it is moved through the exposure station, which exposure station comprises a pair of parallel transport rollers disposed in spaced relation, means defining a planar surface positioned for receiving light directly from said lamp means, said planar surface being disposed between the rollers and extending generally parallel to and on one side of a plane through the axis of said rollers, and a pair of pressure rollers disposed with their axes parallel to the axes of said transport rollers, said pressure rollers having their axes disposed on the same side of the axes of said transport rollers as said planar surface and disposed apart a distance less than the spatial relationship between the axes of the transport rollers such that a line connecting the axis of each transport roller and the axis of the opposed contacting pressure roller will converge with a line perpendicular to and intersecting said planar surface between said pressure rollers eliminating the need for guide plates on both sides of the document path at the exposure station, whereby a document as it is transported between an opposed first pressure roller and a first transport roller the leading edge follows a line tangential to both said opposed rollers and the paper is directed against said planar surface and the successive areas of said document are exposed to light directly from said lamp means and are maintained against said planar surface in a constant focal plane as the successive areas are moved across the planar surface.

2. A document flow camera according to claim 1 wherein said lamp means for exposing the document comprises a pair of lamps disposed parallel to said pressure rollers and adjacent the edge of said pressure rollers opposite said planar surface, said lamps affording direct illumination of a said document disposed on said planar surface to produce a light image of successive areas of said document on a first mirror.

3. A document flow camera according to claim 2 wherein said planar surface is disposed in a plane more vertical than horizontal and said exposure station comprises guide means at one side of said camera for directing said document between said first transport and said first pressure rollers and for directing said document from the other said transport and pressure rollers out of said camera on said one side.

4. A document flow camera according to claim 1 wherein said transport rollers have axially spaced cylindrical document contacting surfaces and said means defining a planar surface comprises a plate having document supporting surfaces disposed between the axis of said transport rollers and said contacting surfaces to avoid documents becoming wrapped on said transport rollers.

5. A document flow camera according to claim 1 wherein said drive means includes a motor and said camera further comprises circuit means for said motor, said circuit means comprising sensing means operative upon a document being placed in said camera, control means for actuating said motor upon operation of said sensing means to afford a first mode of advancement of a predetermined length of said film and to afford a second mode of advancement of a length of said film determined by the subsequent operation of said sensing means under control of said document, and means for controlling said control means to advance said film in one of said modes.

6. A document flow camera according to claim 1 wherein said means for synchronizing the movement of the film includes film advancing means comprising a capstan disposed on an axis parallel with the axis of a said transport roller, and said camera comprises an objective lens positioned adjacent said capstan to focus on said film, and a set of three elongate reflecting members disposed with their longitudinal axis parallel to the axes of said transport rollers and capstan to define a light path from said exposure station to a first reflecting member of said set of reflecting members, to a second adjustable reflecting member of said set of reflecting members, which second member reflects a light image across said path from said exposure station to said first reflecting member to a third reflecting member of said set of reflecting members, and said third reflecting member reflecting the light again across said path from said exposure station to said first reflecting member to said objective lens, and means affording adjustment of said second reflecting member for adjusting the image size on said film.

7. A document flow camera comprising means for advancing a document past an exposure station at a predetermined speed, means for advancing film past a focal plane at a speed synchronized with that of said document to expose said film to successive sections of said document moving through said exposure station, and circuit means for actuating both said means for advancing to afford a first mode of advancement of said film wherein a predetermined length of film is advanced upon actuation of the circuit means and to afford a second mode of advancement of said film wherein said film is continuously advanced upon actuation of the circuit means and to stop said advancement of said film upon a document moving through said exposure station, and means for energizing said circuit means upon a document entering said exposure station and for sensing the trailing edge of a document, and control means for said circuit means to selectively control said circuit to advance said film in one of said modes.

* * * * *